US009926477B2

(12) United States Patent
Wang et al.

(10) Patent No.: US 9,926,477 B2
(45) Date of Patent: Mar. 27, 2018

(54) AGGREGATES OF DIAMOND WITH VITRIFIED BOND

(71) Applicants: SAINT-GOBAIN ABRASIVES, INC., Worcester, MA (US); SAINT-GOBAIN ABRASIFS, Conflans-Sainte-Honorine (FR)

(72) Inventors: Jianna Wang, Grafton, MA (US); Timothy E. Scoville, Winchendon, MA (US)

(73) Assignees: SAINT-GOBAIN ABRASIVES, INC., Worcester, MA (US); SAINT-GOBAIN ABRASIFS, Conflans-Sainte-Honorine (FR)

( * ) Notice: Subject to any disclaimer, the term of this patent is extended or adjusted under 35 U.S.C. 154(b) by 16 days.

(21) Appl. No.: 14/985,890

(22) Filed: Dec. 31, 2015

(65) Prior Publication Data

US 2016/0194540 A1    Jul. 7, 2016

Related U.S. Application Data

(60) Provisional application No. 62/099,006, filed on Dec. 31, 2014.

(51) Int. Cl.
| B24D 3/14 | (2006.01) |
| C09K 3/14 | (2006.01) |
| B24D 3/00 | (2006.01) |
| B24D 11/00 | (2006.01) |
| B24D 11/02 | (2006.01) |

(52) U.S. Cl.
CPC ............ *C09K 3/1436* (2013.01); *B24D 3/002* (2013.01); *B24D 3/14* (2013.01); *B24D 11/005* (2013.01); *B24D 11/02* (2013.01)

(58) Field of Classification Search
CPC ......... C09K 3/1436; B24D 3/002; B24D 3/14
See application file for complete search history.

(56) References Cited

U.S. PATENT DOCUMENTS

| 5,178,644 A | 1/1993 | Huzinec |
| 6,352,567 B1 | 3/2002 | Windisch et al. |
| 6,620,214 B2 | 9/2003 | McArdle et al. |
| 6,881,483 B2 | 4/2005 | McArdle et al. |
| 7,887,608 B2 * | 2/2011 | Schwabel ............... B24D 3/16 428/357 |

(Continued)

FOREIGN PATENT DOCUMENTS

| WO | 2011056680 A2 | 5/2011 |
| WO | 2012006017 A2 | 1/2012 |

(Continued)

OTHER PUBLICATIONS

International Search Report from PCT/US2015/068258 dated Apr. 21, 2016, 1pg.

*Primary Examiner* — Pegah Parvini
(74) *Attorney, Agent, or Firm* — Abel Law Group, LLP; Joseph P Sullivan

(57) ABSTRACT

The present disclosure relates to abrasive aggregates comprised of abrasive particles in a vitreous binder composition, and methods of making and using such abrasive aggregates, including in abrasive articles. The abrasive aggregates can include modifier particles. The abrasive aggregates can include a layer of outer particles on at least a portion of the outer surface of the abrasive aggregate.

18 Claims, 15 Drawing Sheets

(56) References Cited

U.S. PATENT DOCUMENTS

| | | |
|---|---|---|
| 7,985,269 B2 | 7/2011 | Ludwig |
| 8,038,751 B2 | 10/2011 | Starling |
| 8,323,072 B1 | 12/2012 | Billig et al. |
| 8,628,383 B2 | 1/2014 | Starling et al. |
| 2002/0151265 A1 | 10/2002 | Adefris |
| 2003/0213182 A1* | 11/2003 | Knapp ................ B24D 3/04 51/295 |
| 2007/0084133 A1 | 4/2007 | Schwabel et al. |
| 2012/0088443 A1 | 4/2012 | Hsu et al. |
| 2012/0156971 A1 | 6/2012 | Thysell |
| 2013/0065490 A1 | 3/2013 | Landin et al. |
| 2013/0157544 A1 | 6/2013 | McArdle et al. |

FOREIGN PATENT DOCUMENTS

| | | |
|---|---|---|
| WO | 2013181582 A1 | 12/2013 |
| WO | 2016109786 A1 | 7/2016 |

* cited by examiner

AGGREGATES OF DIAMOND WITH VITRIFIED BOND

CROSS-REFERENCE TO RELATED APPLICATION

This application claims priority under 35 U.S.C. § 119(e) to U.S. Provisional Application No. 62/099,006, entitled "Aggregates of Diamond with Vitrified Bond", by Jianna Wang et al., filed Dec. 31, 2014, which is assigned to the current assignee hereof and incorporated herein by reference in its entirety.

FIELD OF THE DISCLOSURE

The present disclosure relates to abrasive aggregates of diamond with a vitrified bond, and methods of making and using such abrasive aggregates, including in abrasive articles.

BACKGROUND

Abrasive tools can use an abrasive to shape or finish a workpiece by wearing away, such as through rubbing or grinding, a portion of the material forming the workpiece. The abrasive can include abrasive grains contained within a bond material. The abrasive grains can include superabrasive grains (e.g., diamond) to provide superior grinding performance on a variety of materials. There exists a need for an improved abrasive or abrasive tool including superabrasive grains.

Abrasive products, such as coated abrasives, bonded abrasives, nonwoven abrasives and loose abrasives are used in various industries to abrade work pieces, such as by lapping, grinding, or polishing. Surface processing using abrasive products spans a wide industrial scope from initial coarse material removal to high precision finishing and polishing of surfaces at a submicron level. Effective and efficient surface processing of extremely hard surfaces, such as metal surfaces, ceramic surfaces, and cermet hybrid surfaces poses numerous challenges, including how to achieve high material removal rates. Therefore, the industry continues to demand further improved abrasive products.

BRIEF DESCRIPTION OF THE DRAWINGS

Embodiments are illustrated by way of example and are not limited in the accompanying figures.

Figure 1:
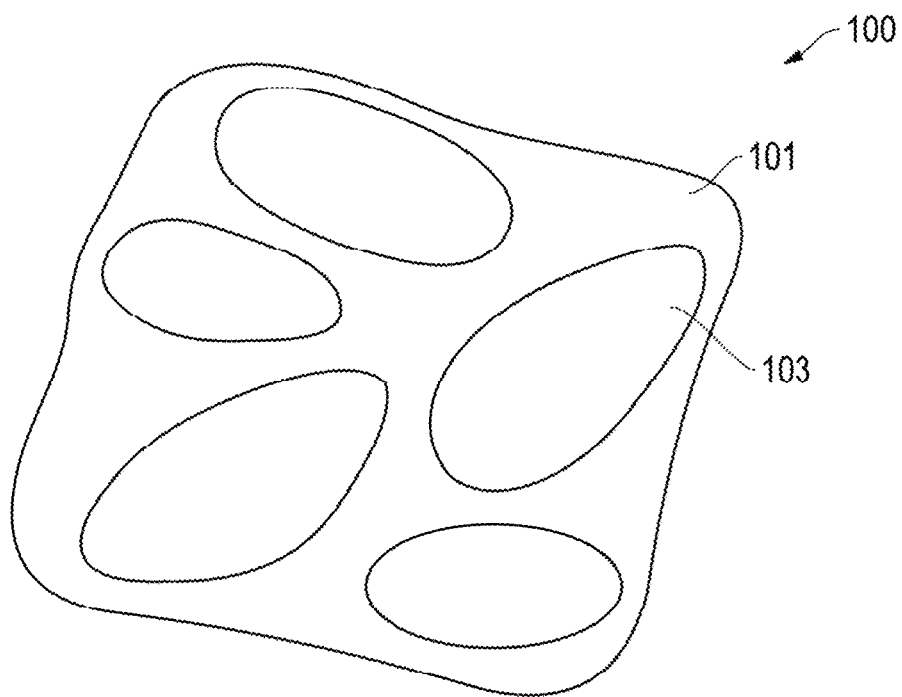
FIG. 1 is an illustration of an embodiment of an abrasive aggregate comprising diamond abrasive particles and a vitreous binder composition.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

As used herein, the term "aggregate" may be used to refer to a particle made of a plurality of smaller particles that have been combined in such a manner that it is relatively difficult to separate or disintegrate the aggregate particle into smaller particles by the application of pressure or agitation. This is in contrast to the term "agglomerate," which is used herein to refer to a particle made up of a plurality of smaller particles that have been combined in such a manner that it is relatively easy to separate the agglomerate particle or disintegrate the agglomerate particle back into smaller particles, such as by the application of pressure or hand agitation.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the abrasive arts.

FIG. 1 shows an illustration of a cross section of an abrasive aggregate 100 comprising a vitreous binder composition 101 and abrasive particles 103 dispersed in the vitreous binder composition, wherein the abrasive particles are diamonds.

Figure 2:
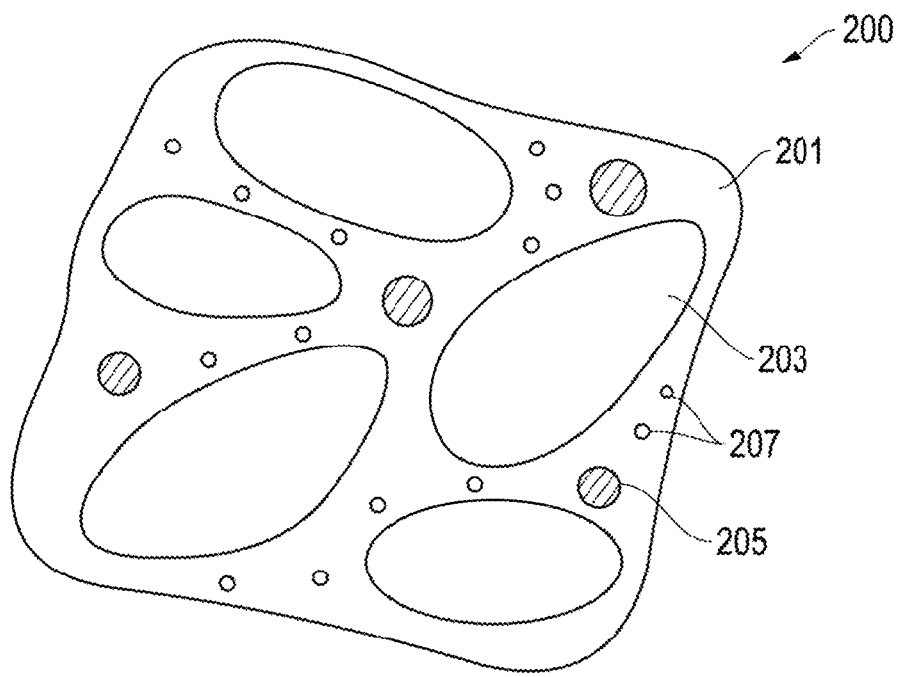
FIG. 2 is an illustration of an embodiment of an abrasive aggregate comprising diamond abrasive particles, modifier particles, pores, and a vitreous binder composition.

FIG. 2 shows an illustration of a cross section of an abrasive aggregate 200 comprising a vitreous binder composition 201 having abrasive particles 203, modifier particles 205, and pores 207 dispersed in the vitreous binder composition, wherein the abrasive particles are diamonds.

Figure 3:
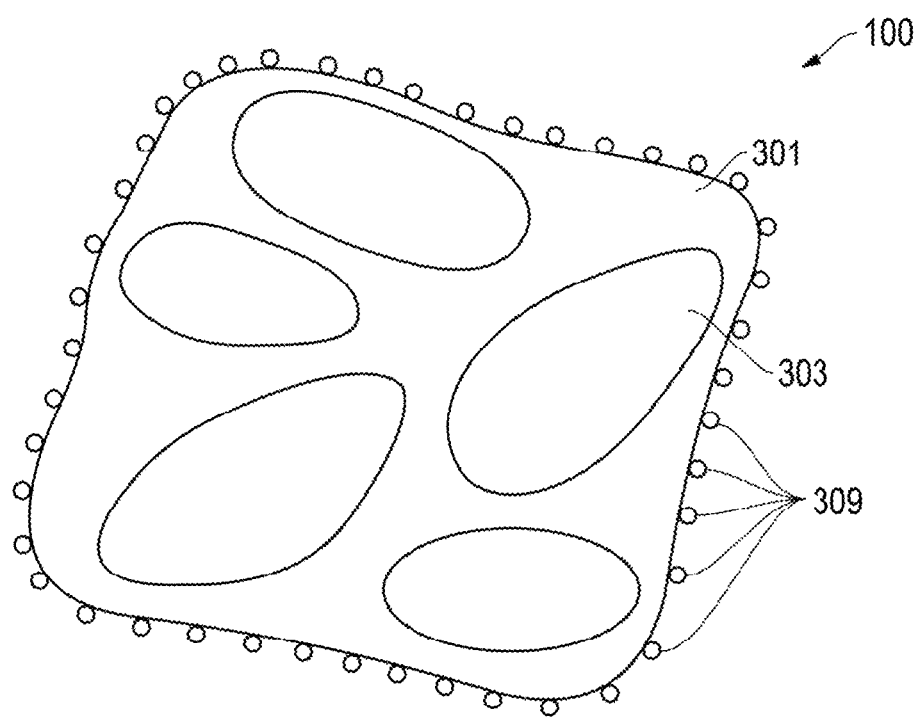
FIG. 3 is an illustration of an embodiment of an abrasive aggregate comprising diamond abrasive particles, a vitreous bond, and a layer of silicon carbide particles disposed on the outer surface of the abrasive aggregate.

FIG. 3 shows an illustration of a cross section of an abrasive aggregate 300 comprising a vitreous binder composition 301 having abrasive particles 303 dispersed in the vitreous binder composition, wherein the abrasive particles are diamonds. A layer of carbide particles 309, such as silicon carbide particles, is disposed on at least a portion of the outer surface of the aggregate. In certain embodiments, the entire outer surface of the abrasive aggregate is covered with carbide particles.

Figure 4:
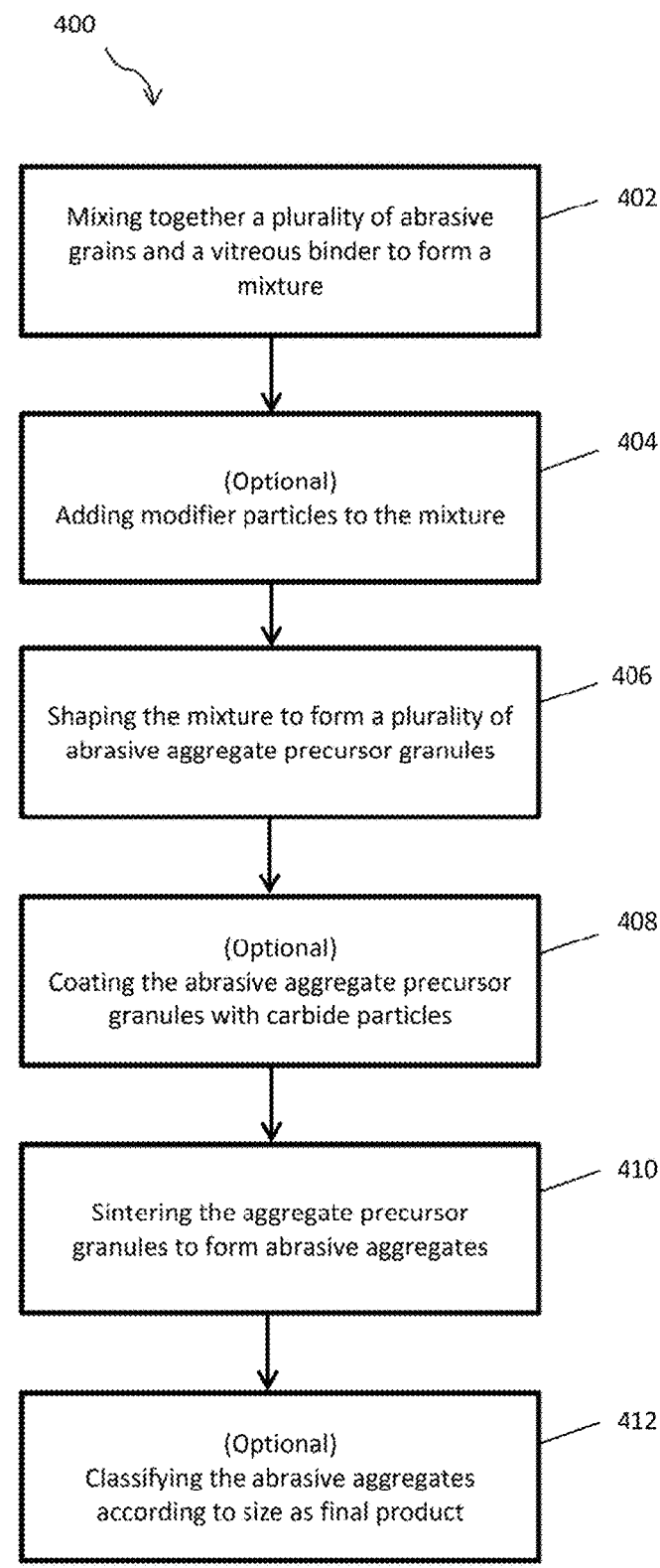
FIG. 4 is a process flow diagram of an embodiment of a method of making an abrasive aggregate.

FIG. 4 shows a process flow diagram of an embodiment of a method 400 of making an abrasive aggregate. Step 402 includes mixing together a plurality of abrasive particles and a vitreous binder composition to form a mixture, wherein the abrasive particles are diamonds. Step 406 includes shaping the mixture to form a plurality of abrasive aggregate precursor granules. Step 410 includes sintering the abrasive aggregate precursor granules to form a plurality of abrasive aggregates. Optionally, step 402 includes mixing one or more modifier particles together with the abrasive particles and the vitreous binder composition to form the mixture prior to shaping the mixture. Optionally, step 408 includes coating the aggregate precursor granules with carbide particles prior to sintering the aggregate precursor granules. Optionally, step 412 includes classifying the abrasive aggregates after sintering.

Abrasive Aggregates

An abrasive aggregate comprises a vitreous binder composition and abrasive particles dispersed in the vitreous binder composition, wherein the abrasive particles are diamonds. In an embodiment, the abrasive aggregate can further comprise one or more modifier particles dispersed in the vitreous binder composition. In another embodiment, the abrasive aggregate can further comprise a layer of carbide particles disposed on at least a portion of the outer surface of the abrasive aggregate.

Abrasive Particles

The abrasive particles can be diamond particles (also referred to herein as "diamonds"), cubic boron nitride particles, or combinations thereof. In an embodiment, the abrasive particles are diamonds. The diamonds can be monocrystalline, polycrystalline, or a combination thereof. The diamonds can be natural diamonds, synthetic diamonds, metal coated diamonds, resin coated diamonds, or combinations thereof. The diamonds can be in a particular size range, conform to a particular size distribution, or a combination thereof. In an embodiment, the diamonds are in a size range of not less than 1 micron and not greater than 2000 microns. In a particular embodiment, the diamonds are in a size range from 100 to 130 microns, such as from 105 to 125 microns.

Modifier Particles

If desired, the abrasive aggregate can comprise one or more modifier particles. In a particular embodiment, the abrasive aggregate does not include modifier particles. In another embodiment, the abrasive aggregate does include one or more modifier particles. The modifier particles can be the same or different. When included, the modifier particles are dispersed within the vitreous bond composition along with the abrasive particles and can affect certain physical and abrasive performance properties of the abrasive aggregate. In an embodiment, the modifier particles can be silicon carbide particles, cerium particles, alumina particles, or a combination thereof. The modifier particles can be in a particular size range, conform to a particular size distribution, or a combination thereof. In an embodiment, the size range of modifying particles can be in a range from 0.1 to 15% of the abrasive particle size. In an embodiment, the modifier particles are in a size range of not less than 0.5 microns and not greater than 100 microns. In an embodiment, the modifier particles include silicon carbide particles in a size range of not less than 1 micron and not greater than 100 microns. In another embodiment, the modifier particles include cerium particles in a size range of not less than 1 micron and not greater than 100 microns. In another embodiment, the modifier particles include aluminum oxide particles in a size range of not less than 1 micron and not greater than 100 microns.

Vitreous Binder Composition

The abrasive aggregate includes a vitreous binder composition (also referred to herein as a glass binder composition, glass bond composition, or glass bond). The vitreous binder composition is a glass composition that can comprise acidic oxides, amphoteric oxides, alkali oxides, neutral oxides, or a combination thereof. Acidic oxides are oxides having the general formula RO or RO2, where R is a metal or transition metal moiety. Acidic oxides can include silicon dioxide (silica) (SiO2), manganese (IV) oxide (MnO2), molybdenum trioxide (molybdite) (MoO3), phosphorus pentoxide (P2O5), titanium dioxide (titania) (TiO2), vanadium (V) oxide (V2O5), and zirconium dioxide (ZrO2), or combinations thereof. Alkali (also known as "basic oxides" or "flux") are oxides having the formula Rx0, where R is a metal or transition metal moiety. In an embodiment, alkali oxides can include cobalt (II) oxide (CoO), copper (II) oxide (cupric oxide)(CuO), nickel (II) oxide (NiO), strontium oxide (strontia) (SrO), magnesium oxide (magnesia) (MgO), calcium oxide (calcia) (CaO), lithium oxide (lithia) (Li2O), barium oxide (baria) (BaO), zinc oxide (calamine)(ZnO), sodium oxide (Na2O), potassium oxide (potash) (K2O), and combinations thereof. Amphoteric oxides are oxides having the general formula R2O3, where R is a metal or transition metal moiety. In an embodiment, amphoteric species can include boron trioxide (boria) (B2O3), chromium (III) oxide (chromia) (Cr2O3), yttrium (III) oxide (yttria) (Y2O3), iron (III) oxide (Fe2O3), and aluminum oxide (alumina) (Al2O3), and combinations thereof. The amount of acidic oxides, basic oxides and amphoteric oxides in the vitreous binder composition can vary. In an embodiment, based on the weight of the vitreous binder composition, the vitreous binder composition comprises about 40 wt % to 65 wt % of total combined acid oxides. In an embodiment, based on the weight of the vitreous binder composition, the vitreous binder composition comprises about 15 wt % to 30 wt % of total combined amphoteric oxides. In an embodiment, based on the weight of the vitreous binder composition, the vitreous binder composition comprises about 15 wt % to 25 wt % total combined basic oxides.

In an embodiment, based on the weight of the vitreous binder composition, the amount of silicon dioxide can be not less than 40 wt %, such as not less than about 45 wt %, not less than about 50 wt %, or not less than about 55 wt %. In another embodiment, based on the weight of the vitreous binder composition, the amount of silicon dioxide can be not greater than 80 wt %, such as not greater than 75 wt %, not greater than 70 wt %, or not greater than 65 wt %. The amount of silicon dioxide can be within a range comprising any pair of the previous upper and lower limits. In a particular embodiment, based on the weight of the vitreous binder composition, the amount of silicon dioxide can be in a range of not less than 45 wt % to not greater than 75 wt %, such as 50 wt % to 70 wt %. In a specific embodiment, based on the weight of the vitreous binder composition, the amount of silicon dioxide can be 55 wt % to 60 wt % or 60 wt % to 65 wt %.

In an embodiment, based on the weight of the vitreous binder composition, the amount of boron trioxide can be not less than 1 wt %, such as not less than about 2 wt %, not less than about 3 wt %, not less than about 4 wt %, or not less than about 5 wt %. In another embodiment, based on the weight of the vitreous binder composition, the amount of boron trioxide can be not greater than 80 wt %, such as not greater than 75 wt %, not greater than 70 wt %, or not greater than 65 wt %. The amount of boron trioxide can be within a range comprising any pair of the previous upper and lower limits. In a particular embodiment, based on the weight of the vitreous binder composition, the amount of boron trioxide can be in a range of not less than 45 wt % to not greater than 75 wt %, such as 50 wt % to 70 wt %. In a specific embodiment, based on the weight of the vitreous binder composition, the amount of boron trioxide can be 55 wt % to 60 wt % or 60 wt % to 65 wt %.

The vitreous binder composition can possess a particular amount of transition metal, which can vary. In an embodiment, based on the weight of the vitreous binder composition, the vitreous binder composition can comprises not less than 1 wt % and not greater than 15 wt % of transition metal.

The vitreous binder composition can have a particular glass transition temperature, sintering temperature, or combination thereof. In an embodiment, the vitreous binder composition has a sintering temperature (Ts) in a range of 550° C. to 800° C. In an embodiment, the vitreous binder composition has a glass transition temperature (Tg) in a range of 490° C. to 700° C.

Abrasive Aggregate Composition

The composition of the abrasive aggregate's major components (i.e., vitreous binder composition, abrasive particles, and modifier particles) can vary within certain ranges. The amount of vitreous binder composition that comprises the abrasive aggregate can be varied. In an embodiment, the vitreous binder composition comprises not less than 1 wt % and not greater than 90 wt % of the weight of the abrasive aggregate, such as not less than 5 wt % and not greater than 85 wt %, or not less than 6 wt % and not greater than 75 wt % of the weight of the abrasive aggregate. The amount of abrasive particle comprising the abrasive aggregate can vary. In an embodiment, the amount of abrasive particles can comprise not less than 15 wt % and not greater than 99 wt % of the weight of the abrasive aggregate. The amount of one or more modifier particles in the abrasive aggregates can vary. The one or more modifier particles can comprise not less than 0.5 wt % and not greater than 15 wt % of the weight of the abrasive aggregate.

In an embodiment, the amount of abrasive particles comprising the abrasive aggregate can be not less than 10 wt %, such as not less than about 15 wt %, not less than about 20 wt %, not less than about 25 wt %, not less than about 30 wt %, not less than about 40 wt %, or not less than about 45 wt %. In another embodiment, the amount of abrasive particles comprising the abrasive aggregate can be not greater than 99 wt %, such as not greater than 95 wt %, not greater than 90 wt %, not greater than 85 wt %, not greater than 80 wt %, not greater than 75 wt %, not greater than 70 wt %, or not greater than 65 wt %. The amount of abrasive particles can be within a range comprising any pair of the previous upper and lower limits. In a particular embodiment, the amount of abrasive particles can be in a range of not less than 10 wt % to not greater than 99 wt %, such as 15 wt % to 95 wt %, or 20 wt % to 90 wt %. In a specific embodiment, the amount of abrasive particles can be 15 wt % to 30 wt %, 45 wt % to 55 wt %, 60 wt % to 70 wt %, or 85 wt % to 90 wt %.

In an embodiment, the amount of vitreous binder composition comprising the abrasive aggregate can be not less than 1 wt %, such as not less than about 3 wt %, not less than about 5 wt %, not less than about 10 wt %, not less than about 15 wt %, not less than about 20 wt %, or not less than about 25 wt %. In another embodiment, the amount of vitreous binder composition comprising the abrasive aggregate can be not greater than 80 wt %, such as not greater than 75 wt %, not greater than 70 wt %, not greater than 65 wt %, not greater than 60 wt %, not greater than 55 wt %, not greater than 50 wt %, or not greater than 45 wt %. The amount of vitreous binder composition can be within a range comprising any pair of the previous upper and lower limits. In a particular embodiment, the amount of vitreous binder composition can be in a range of not less than 1 wt % to not greater than 75 wt %, such as 3 wt % to 70 wt %, or 5 wt % to 65 wt %. In a specific embodiment, the amount of vitreous binder composition can be 5 wt % to 15 wt %, 25 wt % to 35 wt %, 45 wt % to 55 wt %, or 65 wt % to 75 wt %.

In an embodiment, the amount of modifier particles comprising the abrasive aggregate can be 0 wt % (i.e., the abrasive aggregate is comprises essentially only abrasive particles and vitreous binder composition). In another embodiment, the amount of modifier particles comprising the abrasive aggregate can be not less than 0.5 wt %, such as not less than about 1 wt %, not less than about 1.5 wt %, not less than about 2 wt %, not less than about 2.5 wt %, or not less than about 3 wt %. In another embodiment, the amount of modifier particles comprising the abrasive aggregate can be not greater than 15 wt %, such as not greater than 13 wt %, not greater than 10 wt %, not greater than 8 wt %, not greater than 7 wt %, or not greater than 5 wt %. The amount of modifier particles can be within a range comprising any pair of the previous upper and lower limits. In a particular embodiment, the amount of modifier particles can be in a range of not less than 1 wt % to not greater than 15 wt %, such as 1 wt % to 7 wt %, or 1 wt % to 5 wt %.

Aggregate Size

The abrasive aggregate can be in a particular size range, conform to a particular size distribution, or a combination thereof. In an embodiment, the size range of the abrasive aggregate can be in a range not less than 2 microns, such as not less than 5 microns, not less than 10 microns, not less than 20 microns, not less than 50 microns, not less than 75 microns, not less than 90 microns, not less than 100 microns, not less than 125 microns, not less than 140 microns, or not less than 150 microns. In an embodiment, the abrasive aggregate can have a size range of not greater than 10,000 microns, such as not greater than 7500 microns, not greater than 5000 microns, not greater than 4000 microns, not greater than 2000 microns, not greater than 1800 microns, not greater than 1500 microns, not greater than 1200 microns, not greater than 1000 microns, not greater than 900 microns, not greater than 800 microns, not greater than 700 microns, or not greater than 600 microns. The size of the abrasive aggregate can be within a range comprising any pair of the previous upper and lower limits. In a particular embodiment, the size of the abrasive aggregate can be in a range of not less than 2 microns to not greater than 4000 microns.

Aggregate Coating Layer

If desired, at least a portion of the outer surface of the abrasive aggregate can be covered with outer layer particles, such as carbide particles, alumina particles, or a combination thereof. In an embodiment, no portion of the abrasive aggregate is covered with a outer layer of carbide particles or alumina particles. In another embodiment, at least a portion of the outer surface of the abrasive aggregate can be covered with carbide particles, alumina particles, or a combination thereof. The amount of the surface of the aggregate that is covered with carbide particles, alumina particles, or a combination thereof can vary. In an embodiment, the portion of the outer surface of the abrasive aggregate that is covered with the particles is not less than 5% and not more than 100% of the outer surface of the abrasive aggregate.

The particles of the outer layer can vary in size. In an embodiment, the outer layer particles can be in a size range of not less than 1 micron and not greater than 100 microns.

The size of the outer layer particles can have a certain relationship with respect to the size of the abrasive aggregate. In an embodiment, the size of the outer layer particles are in a particular ratio range with the size of the abrasive aggregate ($Size_{outer\ layer}:Size_{Aggregate}$). In a particular embodiment, the ratio of the size of the outer layer particles to the abrasive aggregate ($Size_{outer\ layer}$:SizeAggregate) is in a range of 1:500 to 1:20.

The carbide particles can include boron carbide, silicon carbide, tungsten carbide, and combinations thereof. In an embodiment, the carbide particles are silicon carbide particles.

Aggregate Properties

The abrasive aggregates can possess beneficial and characteristic properties. The abrasive aggregates can have a beneficial loose packed density in a particular range. In an embodiment, the abrasive aggregates have a loose packed density in a range of not less than 0.5 g/cm3 to not greater than 3.5 g/cm3. In a specific embodiment, the abrasive aggregates have a loose packed density in a range of not less than 2.75 g/cm3 to not less than 3.0 g/cm3.

The abrasive aggregate can have a beneficial porosity in a particular range. In an embodiment, the abrasive aggregates have a porosity in a range of 5% to 85% as measured by mercury porosimetry.

The abrasive aggregate can have a beneficial crush strength (represented by a crush %) in a particular range. In an embodiment, the abrasive aggregates have a crush % value of not greater than 90%, such as not greater than 85%, not greater than 80%, not greater than 75%, not greater than 70%, not greater than 65%, not greater than 60%, not greater than 55%, not greater than 50%, not greater than 45%, not greater than 40%, or not even greater than 35%, wherein the crush % is measured at a load of 5 MPa. The crush strength can be measured at a particular sieve mesh size, such as (−35/+45), or −40/+60), or the like.

Method of Making an Abrasive Aggregate

In general, the aggregate can be made by providing an aggregate forming mixture, processing the aggregate forming mixture into an aggregate precursor, and processing the aggregate precursor into the aggregate.

Returning to FIG. 4, step 402 includes mixing together a plurality of abrasive particles and a vitreous binder composition to form a mixture, wherein the abrasive particles are diamonds. This activity can be accomplished by combining one or more glass frit powders that contain the desired combination of oxides with diamonds. The mixing can be done wet (aqueous) or dry. In an embodiment, the mixing is performed with the aid of an aqueous solution of polyethylene glycol, which acts as a temporary organic binder that allows the glass powder and diamond mixture to be shaped. Other organic temporary binders are known in the art. If desired, as indicated in step 404, modifier particles can be added to the mixture of vitreous binder composition and diamonds. Adequate mixing of the vitreous binder composition can be accomplished by any known suitable methods. In an embodiment, the ingredients are mixed together using a mortar and pestle until uniform. In another embodiment, the ingredients are mixed together using an automated tumbler until uniform. In another embodiment, the ingredients are combined in an automated grinder mixer until uniform.

Step 406 includes shaping the mixture to form a plurality of abrasive aggregate precursor granules. Shaping of the mixture to form a plurality of abrasive aggregate precursor granules may be accomplished by any means suitable for shaping a wet mixture into granules, including shaping by screening, pressing, sieving, extruding, segmenting, casting, stamping, cutting, or a combination thereof. In particular, the wet mixture may be shaped into the abrasive aggregate precursor granules by pushing, or otherwise moving, the wet mixture through a sieve or screen.

An additional optional activity (not shown), is drying the plurality of aggregate precursor granules. Drying can be performed at temperatures below the expected curing temperature, such as at ambient temperature, to remove water from the mixture but leave the aggregate precursor granules unsintered. Dried aggregate precursor granules can be stored for later usage. The dried aggregate precursor granules can then be sintered prior to being used or incorporated into a fixed abrasive article. In an embodiment, drying the plurality of shaped aggregate precursor granules is performed.

Step 410 includes sintering the abrasive aggregate precursor granules to form a plurality of abrasive aggregates. Sintering of the aggregate precursor granules can be accomplished by any known suitable methods. Sintering can be done under pressure or at ambient pressure. The sintering atmosphere can be a reducing atmosphere if desired. In an embodiment, the aggregate precursor granules are fired with graphite powder to prevent oxidation. The heat can be ramped up in intervals, followed by a heat soak at a desired temperature or temperatures for a desired period of time, followed by a cool down period. In an embodiment, the sintering is accomplished by ramping up the temperature until a desired sintering temperature in a range of 600° C. to 800° C. is reached, the granules are soaked at that temperature for about 1 to 5 hours and then allowed to cool down. In another embodiment, the precursor granules are disposed on a graphite sheet during the sintering process.

It has been observed by Applicants that during sintering, the precursor granules can loose their shape and melt together, which requires additional crushing post cooling, and tends to reduce the yield of useable abrasive abrasives produced (yield of about 30-40%). Applicants have surprisingly discovered that coating at least a portion of the precursor granules with a layer of carbide particles substantially improves the yield of the abrasive aggregates (yield of about 50% to greater than 90%). Therefore, in an embodiment, Step 408 is performed prior to sintering, and coating the precursor granules with a layer of carbide particles occurs. Applying the coating of carbide particles to the surface of the abrasive precursor granules can be accomplished placing the surface of the precursor granules in contact with the carbide particles. Suitable methods include, pouring the carbide particles onto the surface of the precursor granules, or placing the precursor granules in a container with a sufficient amount of carbide particles to cover a desired amount of surface area of the precursor granules. In an embodiment, the amount of carbide particles used to coat a portion of the precursor granules equal to 0.5 to 4 times the weight of the precursor granules. Put another way, the ratio of the weight of the carbide particles to precursor granules is in a range from 0.5:1 to 4:1. In an alternate embodiment, at least a portion of the precursor granule can be covered with a layer of oxide particles to improve the yield of the abrasive aggregates. Oxide particles can include alumina particles. In a specific embodiment, at least a portion of the precursor granule is covered with alumina particles. In another specific embodiment, at least a portion of the precursor granule is covered with particles comprising carbide particles, oxide particles, or a combination thereof. Optionally, in step 412, the sintered, completed abrasive aggregates can be classified according to size prior to being used as a loose abrasive or being incorporated into a fixed abrasive, such as a coated abrasive, nonwoven abrasive, or bonded abrasive.

Loose Abrasives and Abrasive Articles

Completed abrasive aggregates can be used as loose abrasives (e.g., in an abrasive slurry or as blast media) or incorporated into fixed abrasives. Fixed abrasives include bonded abrasives, coated abrasives, nonwoven abrasives, engineered abrasives (also called structured abrasives), and combinations thereof. In specific embodiments, completed abrasive aggregates can be incorporated into bonded abrasive wheels, nonwoven abrasive wheels, coated abrasive discs, coated abrasive belts, coated abrasive sheets, coated abrasive films, or a combination thereof.

In specific embodiments, fixed abrasive articles include lofty open nonwoven abrasive articles (e.g., webs and sheets), unified (also called "unitized" in the art) abrasive wheels, and convolute abrasive wheels, that can be manufactured through processes that include common steps known in the art such as: coating a curable composition, typically in slurry form, on a nonwoven fiber web. The curable composition can comprise polymeric prepolymer; a curative; and optionally additives. In the formation of nonwoven abrasive wheels, the nonwoven fiber web is typically compressed (i.e., densified).

Nonwoven fiber webs suitable for use in the aforementioned abrasive articles are well known in the abrasives art. Typically, the nonwoven fiber web comprises an entangled web of fibers. The fibers may comprise continuous fiber, staple fiber, or a combination thereof. The fiber web may be made air laid, carded, stitch bonded, spun bonded, wet laid, hydroentanglement, and/or melt blown procedures.

Nonwoven fiber webs are typically selected to be suitably compatible with adhering binders and abrasive particles while also being processable in combination with other components of the article, and typically can withstand processing conditions (e.g., temperatures) such as those employed during application and curing of the curable composition. The fibers may be chosen to affect properties of the abrasive article such as, for example, flexibility, elasticity, durability or longevity, abrasiveness, and finishing properties. Examples of fibers that may be suitable include natural fibers, synthetic fibers, and mixtures of natural and/or synthetic fibers. The fiber may be homogenous or a composite such as a bicomponent fiber (e.g., a co-spun sheath-core fiber). The fibers may be tensilized and crimped, but may also be continuous filaments such as those formed by an extrusion process. Combinations and blends of fibers may also be used.

Prior to impregnation with the curable composition, the nonwoven fiber web typically has a specific weight per unit area (i.e., basis weight) and thickness. Frequently, as known in the art, it is useful to apply a pre-bond resin to the nonwoven fiber web prior to coating with the curable composition. The pre-bond resin serves, for example, to help maintain the nonwoven fiber web integrity during handling, and may also facilitate bonding of the binder composition to the nonwoven fiber web. Suitable prebond resins (blocked or unblocked) can include phenolic resins, urethane resins, hide glue, acrylic resins, urea-formaldehyde resins, melamine-formaldehyde resins, epoxy resins, and combinations thereof. The amount of pre-bond resin is typically adjusted toward the minimum amount consistent with bonding the fibers together at their points of crossing contact. In another embodiment, the nonwoven fiber web can include thermally bondable fibers, and thermal bonding of the nonwoven fiber web can be helpful to maintain web integrity during processing.

Optionally, the curable composition can be mixed with and/or include one or more additives. Additives can include fillers, plasticizers, surfactants, lubricants, colorants (e.g., pigments), bactericides, fungicides, grinding aids, and antistatic agents.

In an embodiment, a nonwoven abrasive web is prepared by adhering inventive abrasive aggregates as described herein to a nonwoven web with a curable binder. The coating weight for the abrasive aggregates (independent of other ingredients in the curable composition) can depend on the particular binder used, the process for applying the abrasive aggregates, and the size of the abrasive aggregates.

Binders useful for adhering the abrasive aggregates to the nonwoven fiber web are known in the art and can be selected according to the final product requirements. Typical binders can include those comprising polyurethane, phenolic, acrylate, and combinations thereof.

In a particular embodiment, the abrasive article is a nonwoven abrasive article comprising: a nonwoven web; a binder disposed on (and/or throughout) the nonwoven web, and abrasive aggregates as described herein disposed on the binder.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the items as listed below.

Embodiment 1. An abrasive aggregate comprising: a vitreous binder composition and abrasive particles dispersed in the vitreous binder composition, wherein the abrasive particles are diamonds.

Embodiment 2. The abrasive aggregate of embodiment 1, further comprising one or more modifier particles dispersed in the vitreous binder composition.

Embodiment 3. The abrasive aggregate of embodiment 1, further comprising a layer of carbide particles disposed on at least a portion of the outer surface of the abrasive aggregate.

Embodiment 4. A method of forming an abrasive aggregate comprising: mixing together a plurality of abrasive particles and a vitreous binder composition to form a mixture; shaping the mixture to form a plurality of abrasive aggregate precursor granules; sintering the abrasive aggregate precursor granules to form a plurality of abrasive aggregates. wherein the abrasive particles are diamonds.

Embodiment 5. The abrasive aggregate of embodiment 1, wherein the vitreous binder composition comprises not less than 1 wt % and not greater than 90 wt % of the weight of the abrasive aggregate.

Embodiment 6. The abrasive aggregate of embodiment 1, wherein the abrasive particles comprise not less than 10 wt % and not greater than 99 wt % of the weight of the abrasive aggregate.

Embodiment 7. The aggregate of embodiment 2, wherein the one or more modifier particles comprise not less than 0.5 wt % and not greater than 15 wt % of the weight of the abrasive aggregate.

Embodiment 8. The abrasive aggregate of embodiment 1, wherein the abrasive aggregate has a loose packed density in a range of not less than 0.5 g/cm$^3$ to not greater than 3.5 g/cm$^3$.

Embodiment 9. The abrasive aggregate of embodiment 1, wherein the abrasive aggregate has a loose packed density in a range of not less than 2.75 g/cm$^3$ to not less than 3.0 g/cm$^3$.

Embodiment 10. The abrasive aggregate of embodiment 1, wherein the abrasive aggregate has a porosity in a range of 5% to 75% as measured by mercury porosimetry.

Embodiment 11. The diamonds of embodiment 1, wherein the diamonds are in a size range of not less than 1 micron and not greater than 2000 microns.

Embodiment 12. The diamonds of embodiment 1, wherein the diamonds are monocrystalline, polycrystalline, or a combination thereof.

Embodiment 13. The diamonds of embodiment 1, wherein the diamonds are natural diamonds, synthetic diamonds, metal coated diamonds, resin coated diamonds, or combinations thereof.

Embodiment 14. The modifier particles of embodiment 1, wherein the modifier particles are silicon carbide particles, cerium particles, alumina particles, or a combination thereof.

Embodiment 15. The modifier particles of embodiment 1, wherein the modifier particles are in a size range of not less than 0.5 microns and not greater than 100 microns.

Embodiment 16. The modifier particles of embodiment 14, wherein the modifier particles include silicon carbide particles in a size range of not less than 1 micron and not greater than 100 microns.

Embodiment 17. The modifier particles of embodiment 14, wherein the modifier particles include cerium particles in a size range of not less than 1 micron and not greater than 100 microns.

Embodiment 18. The modifier particles of embodiment 14, wherein the modifier particles include aluminum oxide particles in a size range of not less than 1 micron and not greater than 100 microns.

Embodiment 19. The vitreous binder composition of embodiment 1, wherein the vitreous binder composition has a sintering temperature (Ts) in a range of 550° C. to 800° C.

Embodiment 20. The vitreous binder composition of embodiment 1, wherein the vitreous binder composition has a glass transition temperature (Tg) in a range of 490° C. to 700° C.

Embodiment 21. The vitreous binder composition of Embodiment 1, wherein the vitreous binder composition comprises not less than 1 wt % and not greater than 15 wt % transition metal.

Embodiment 22. The vitreous binder composition of embodiment 1, wherein the vitreous binder composition comprises about 40 wt % to 65 wt % of total combined acid oxides, about 15 wt % to 30 wt % of total combined amphoteric oxides, and about 15 wt % to 25 wt % total combined base oxides and neutral oxides.

Embodiment 23. The abrasive aggregate of embodiment 3, wherein the portion of the outer surface of the abrasive aggregate that is covered by the carbide particles is not less than 5% and not more than 100% of the outer surface of the abrasive aggregate.

Embodiment 24. The abrasive aggregate of embodiment 3, wherein the ratio of the size of the carbide particles and the size of the abrasive aggregate ($Size_{carbide}:Size_{Aggregate}$) is in a range of 1:500 to 1:50.

Embodiment 25. The abrasive aggregate of embodiment 3, wherein the carbide particles are silicon carbide particles.

Embodiment 26. The method of embodiment 4, further comprising mixing one or more modifier particles together with the abrasive particles and a vitreous binder composition to form the mixture prior to shaping the mixture.

Embodiment 27. The method of embodiment 4, further comprising coating the aggregate precursor granules with carbide particles prior to sintering the aggregate precursor granules.

Embodiment 28. The method of embodiment 4, further comprising coating the aggregate precursor granules with carbide particles prior to sintering the aggregate precursor granules.

EXAMPLES

The properties and advantage of the present disclosure are illustrated in further detail in the following nonlimiting examples. Unless otherwise indicated, temperatures are expressed in degrees Celsius, pressure is ambient, and concentrations are expressed in weight percentages.

Components Listing

DX200® brand glass frit (available from Saint-Gobain Abrasives at Worcester, Mass., USA).

Pemco B6® brand glass bond (available from Saint-Gobain Abrasives at Worcester, Mass., USA).

WA2500® brand 5.5 μm aluminum oxide grain (available from Graystar, LLC at Bluffton, S.C., USA).

ABC Mesh® brand 120/140 grit resin-bonded diamond mesh (available from Saint-Gobain Specialty Grains and Powders at Olyphant, Pa., USA).

33% solution of 20M CARBOWAX™ brand Polyethylene Glycol binder (available from The Dow Chemical Company at Midland, Mich., USA).

Cerium (commonly commercially available).

J3000 grit silicon carbide (available from Graystar, LLC at Bluffton, S.C., USA).

Example 1

Preparation of Samples S1-S3

Samples abrasive aggregates (S1-S3) having different amount of glass bond were prepared using the materials and amounts listed in Table 1.

TABLE 1

Abrasive Aggregates S1-S3

| | S1 wt % Wet | S1 wt % Dry | S1 wt % Fired | S2 wt % Wet | S2 wt % Dry | S2 wt % Fired | S3 wt % Wet | S3 wt % Dry | S3 wt % Fired |
|---|---|---|---|---|---|---|---|---|---|
| Glass Bond A | 59.6 | 65.7 | 69.2 | 42.3 | 45.7 | 47.6 | 28.5 | 30.9 | 32.3 |
| Diamonds | 21.3 | 23.5 | 24.7 | 42.3 | 45.7 | 47.6 | 56.9 | 61.8 | 64.5 |
| Organic Binder | 14.0 | 5.1 | 0.0 | 11.2 | 4.0 | 0 | 11.8 | 4.3 | 0 |
| Cerium | 4.3 | 4.7 | 4.9 | 0 | 0 | 0 | 0 | 0 | 0 |
| SiC | 0.9 | 1.0 | 1.1 | 4.2 | 4.6 | 4.8 | 2.8 | 3.1 | 3.2 |

Samples 1-3 were prepared according to the following method:

All ingredients except for diamonds the organic binder were mixed in a beaker with a spoon and then screened with a mesh 140 sieve. The diamonds were added and then the organic binder was spoon-mixed in to achieve a uniform wet mixture. The wet mixture was then hand pushed through mesh 20 sieve to form wet aggregate precursor granules. The wet precursor granules were dried, then screened with a mesh 20 sieve, and then fired in the presence of graphite powder to prevent oxidation. The firing profile was ramp 300° C./hr., soak at 550° C. for 1 hr., then 690° C. for 4 hr., then cool.

Figure 5:
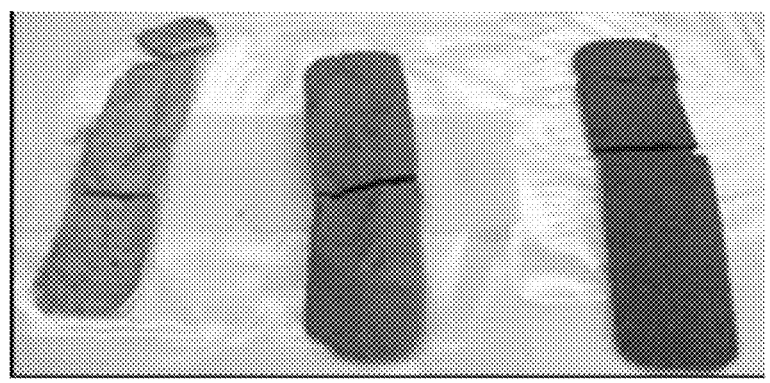
FIG. 5 is a photograph of bars of abrasive aggregate material formed according to an embodiment.

The fired aggregates for each sample composition (S1-S3) melted together to form bars, as shown in FIG. 5 from left to right respectively. It is notable that the fired bars shown in FIG. 5 had various shades of gray color due to the various concentrations of diamond grain. Because the diamonds have a black color, the color of the bars darkens as the diamond concentration increases. Therefore, S1, with about 25 wt % diamond, had the lightest gray color, S2, with about 48 wt % diamond, had the middle gray color, and S3, with about 64 wt % diamond, had the darkest gray color.

The fired bars were then crushed and sieved to collect abrasive aggregates having a size between mesh 25 and 80. The fired S1-S3 aggregates contained about 1-5 wt % SiC as a modifier, which functioned as pore inducer. S1 also contained about 5 wt % of 5 μm cerium particles, which created extra porosity in the fired aggregates. Measured properties of the fired aggregates are provided below in Table 2. Note that loose pack density increased with increasing diamond concentration and the addition of cerium appears to contribute to an increase in porosity.

Crush Testing and Loose Pack Density

As described further below samples are subjected to crush % testing as follows. Aggregate samples were screened at or between a particular mesh size (e.g., between mesh 35 and 45); and a fixed amount of each sample (e.g., 5 grams) was placed in a one inch die. The die was then subjected to a pressure of 5 MPa. The collected aggregate was again screened and the amount that passed through the mesh screens was collected and recorded. The higher the percentage of material that passed through the screen(s), the greater the amount of material that was crushed, thus indicating a weaker aggregate.

To determine loose pack density, the fired aggregate is poured through a funnel in a 100 cc cup. Any excess material is removed with a blade and the cup is weighed. The loose pack density is equal to the weight divided by the cup volume.

The crush % and loose pack density for the samples are presented in the table below.

TABLE 2

Properties of S1-S3 fired aggregates

| Sample | wt % Glass Bond | Aggregate Size Cut | Loose Pack Density (g/cm3) | Crush % | Comments |
|---|---|---|---|---|---|
| S1 | 69.2 | mesh 25/80 | 0.93 | 100 | 5% Ce, 1% SiC |
| S2 | 47.6 | mesh 25/80 | 0.95 | 80 | 5% SiC |
| S3 | 32.3 | mesh 25/80 | 1.25 | 100 | 3% SiC |

Figure 6A:
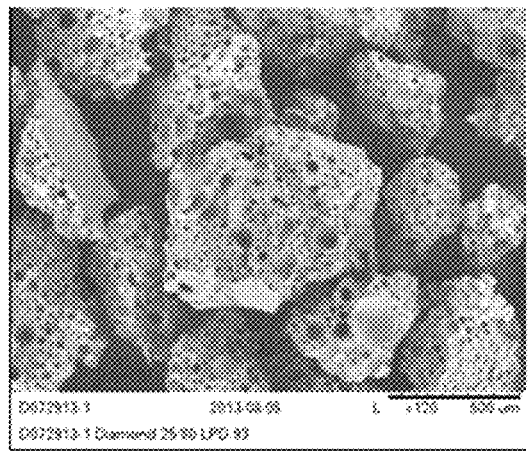
FIG. 6A is an image of abrasive aggregates according to an embodiment.
Figure 6B:
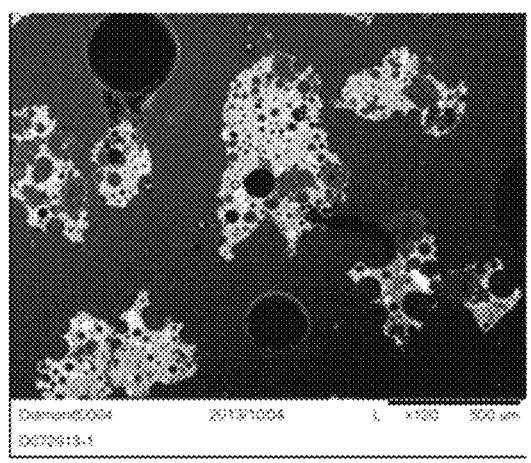
FIG. 6B is a cross section image of the abrasive aggregates shown in FIG. 6A.
Figure 7A:
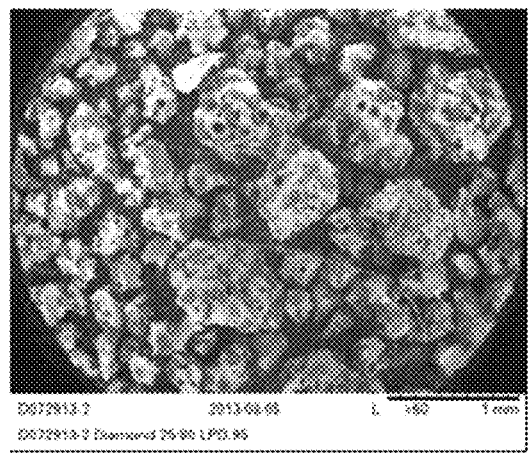
FIG. 7A is an image of abrasive aggregates according to an embodiment.
Figure 7B:
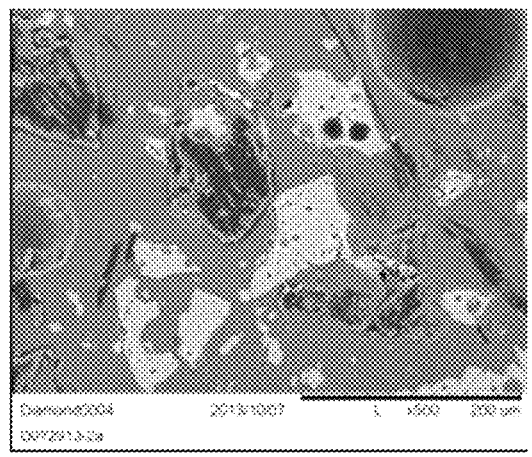
FIG. 7B is a cross section image of the abrasive aggregates shown in FIG. 7A.
Figure 8A:
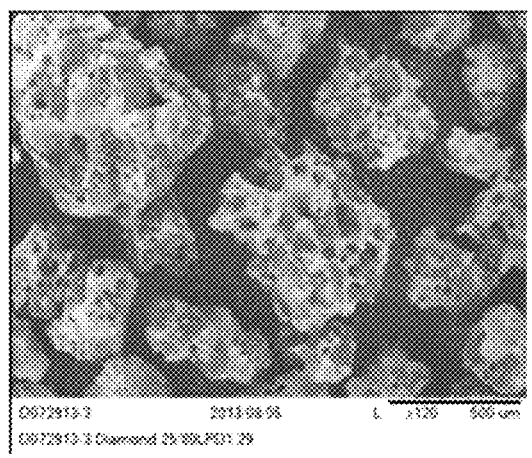
FIG. 8A is an image of abrasive aggregates according to an embodiment.
Figure 8B:
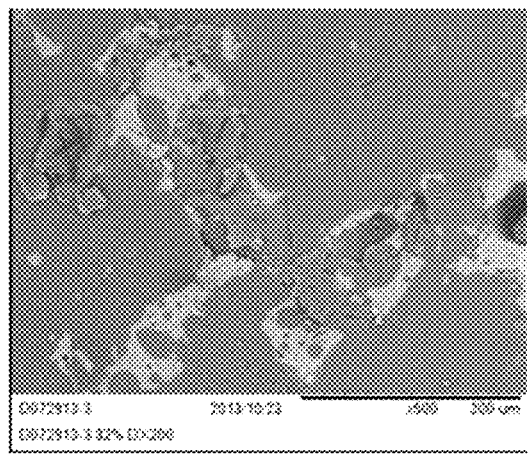
FIG. 8B is a cross section image of the abrasive aggregates shown in FIG. 8A.

SEM images of the fired aggregates and cross sections of the fired aggregates are provided: FIG. 6A and FIG. 6B for S1, FIG. 7A and FIG. 7B for S2, and FIG. 8A and FIG. 8B for S3.

Example 2

S4 and S5

Samples 4 and 5 were prepared the same as S3, above in Example 1, except that SiC was not used in S4 and S5, and a different glass bond (glass bond B instead of glass bond A) was used for S5. Glass bond A and glass bond B compare as follows:

Glass bond B: contains 7% transition metal; Tg=509° C., Ts=580° C.;

Glass bond A: contains 2% transition metal; Tg=512° C.; Ts=580° C.; and
Glass bond B has lower viscosity and flows better than Glass bond A.

S4 and S5 were prepared using the materials and amounts listed in Table 3.

TABLE 3

Abrasive Aggregates S4-S5

| Sample | S4 wt % Wet | S4 wt % Dry | S4 wt % Fired | S5 wt % Wet | S5 wt % Dry | S5 wt % Fired |
|---|---|---|---|---|---|---|
| Glass Bond A | 30.2 | 32.2 | 33.3 | — | — | — |
| Glass Bond B | — | — | — | 30.2 | 32.2 | 33.3 |
| Diamonds | 60.4 | 64.5 | 66.7 | 60.4 | 64.5 | 66.7 |
| Organic Binder | 9.3 | 3.3 | 0 | 9.3 | 3.3 | 0 |
| Cerium | — | — | — | — | — | — |
| SiC | — | — | — | — | — | — |

S4 and S5 were prepared according to the same method as S3 above in Example 1, except that, for S4 and S5, a mesh 60 sieve was used to break up lumps in the mixed dry ingredients, and the firing profile was changed to: ramp 180° C./hr., soak at 750° C. for 1 hr, then cool.

Figure 9:
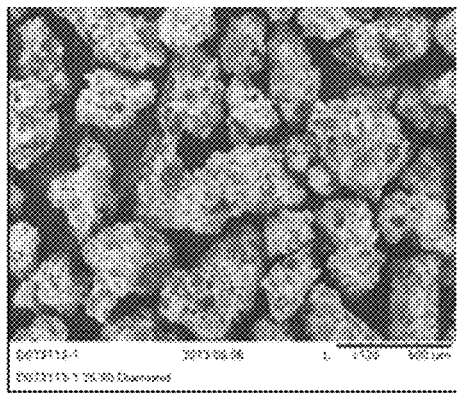
FIG. 9 is an image of abrasive aggregates according to an embodiment.
Figure 10:
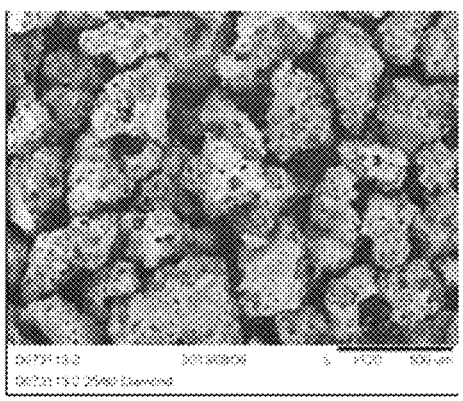
FIG. 10 is an image of abrasive aggregates according to an embodiment.

FIG. 9 shows an SEM image of the fired aggregates of S4. FIG. 10 shows an SEM image of the fired aggregates of S5. The S4 and S5 aggregates both appeared to have the same surface morphology; however, crush testing at 5 MPa of the fired aggregates having a size cut of mesh 35/45 showed that the S4 aggregate had a 76% crush strength and the S5 aggregate was weaker with a 90% crush strength.

TABLE 4

Properties of S4-S5 Fired Aggregates

| Sample | wt % Glass Bond | Aggregate Size Cut | Loose Pack Density (g/cm3) | Crush % | Comments |
|---|---|---|---|---|---|
| S4 | 33.3 | mesh 35/45 | — | 76 | glass bond A |
| S5 | 33.3 | mesh 35/40 | — | 90 | glass bond B |

Example 3

S6

Sample 6 was prepared the same as S1 above in Example 1, except that S6 includes significantly less glass bond than S1.

S6 was prepared using the materials and amounts listed in Table 5.

TABLE 5

Abrasive Aggregates S6

| | S6 wt % Wet | S6 wt % Dry | S6 wt % Fired |
|---|---|---|---|
| Glass Bond A | 33.8 | 36.8 | 38.5 |
| Diamonds | 54.1 | 58.8 | 61.5 |
| Organic Binder | 12.2 | 4.4 | 0 |
| Cerium | — | — | — |
| SiC | — | — | — |

The method for making Sample 6 is as follows. First, the glass bond and the diamond grain were mixed in an automated mixer for 5 minutes. Under agitation, the organic binder was added to achieve a consistent wet mixture. Wet precursor granules were formed with a Quadro Comil using a mesh 7C032 screen (0.81 mm, equivalent to mesh 20). The remaining wet mixture was hand pushed through a mesh 20 screen to produce additional wet precursor granules. The wet precursor granules were then dried, screened with mesh 20, and fired with a layer of graphite using the following firing profile: ramp 180° C./hr., soak at 750° C. for 1 hr., and cool down. The precursor granules melted together to form a fired block, which was then crushed and sieved to collect fired aggregates between size mesh 25 and mesh 80.

Figure 11:
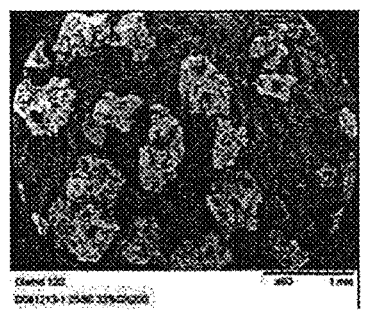
FIG. 11 is an image of abrasive aggregates according to an embodiment.

1 kg of diamond aggregates having a size in a range of 0.18 mm to 0.75 mm (US standard mesh 25/80) were produced. FIG. 11 is an SEM image of the produced fired aggregates for S6.

TABLE 6

Properties of S6 Fired Aggregates

| Sample | wt % Glass Bond | Aggregate Size Cut | Loose Pack Density (g/cm3) | Crush % (35/45) @ 5 MPa | Comments |
|---|---|---|---|---|---|
| S6 | 38.5 | Mesh 25/80 | 1.18 | 68 | Glass Bond A |

The loose pack density (LPD) of Sample 6 was 1.18 g/cc, and the crush strength of 35/45 cut at 5 MPa was 68%.

TABLE 7

Abrasive Testing of Nonwoven Abrasive Wheels

| Sample | Avg Cut (g) | Avg Shed, (g) | Grind-ratio (cut/shed) | Comparison to Avg. Control Cut | Comparison to Control Grind Ratio |
|---|---|---|---|---|---|
| Control | 2.42 | 0.80 | 3.02 | 1.00 | 1.00 |
| S6 | 3.05 | 0.62 | 4.88 | 1.26 | 1.62 |

Figure 12:
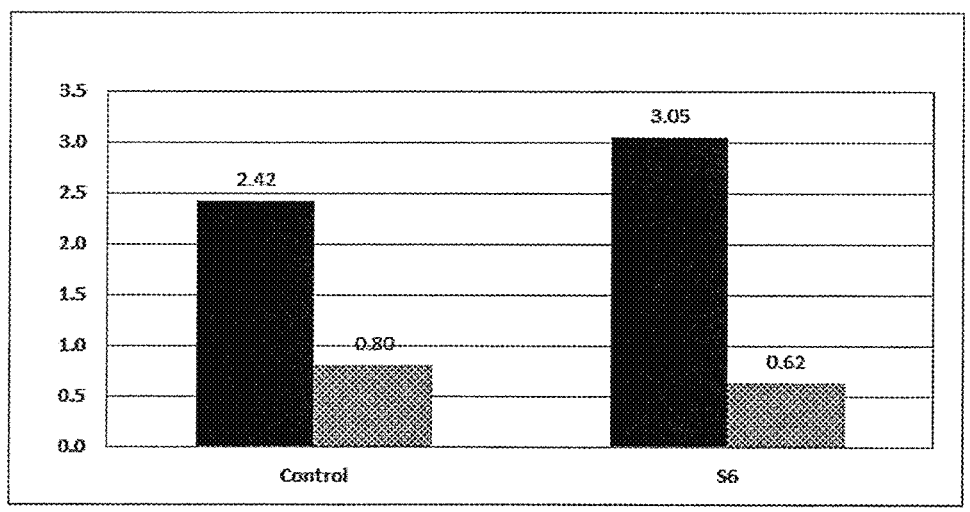
FIG. 12 is a graph comparing abrasive performance of a nonwoven wheel that includes inventive abrasive aggregates according to an embodiment to abrasive performance of nonwoven wheels that include conventional diamonds.

In addition, S6 was tested for grinding properties using a BearTex Unified wheel. The initial grinding test results on a tungsten carbide work piece showed that S6 had a 26% higher material removal than that conventional loose diamond grit. See FIG. 12

Example 4

S7

Sample 7 was made using the materials and amounts listed in Table 8.

TABLE 8

Abrasive Aggregates S7

| | S7 wt % Wet | S7 wt % Dry | S7 wt % Fired |
|---|---|---|---|
| Glass Bond A | 56.82 | 63.92 | 68.18 |
| Diamonds | 20.83 | 23.44 | 25 |
| OrganicBbinder | 16.67 | 6.25 | 0 |
| Alumina | 5.68 | 6.39 | 6.82 |
| SiC | — | — | — |

Sample 7 was prepared according to the following method:

All the ingredients except for the glass bond and organic binder were weighed into a jar and mixed with an automated tumbler for 30 minutes. The glass bond and organic binder were then mixed with the other ingredients to form a uniform wet mixture. The wet mixture was screened with mesh 30 and the formed precursor granules were dried in an oven at 350° F. for 1 hour and then air dried for 8-12 hours.

Figure 13A:
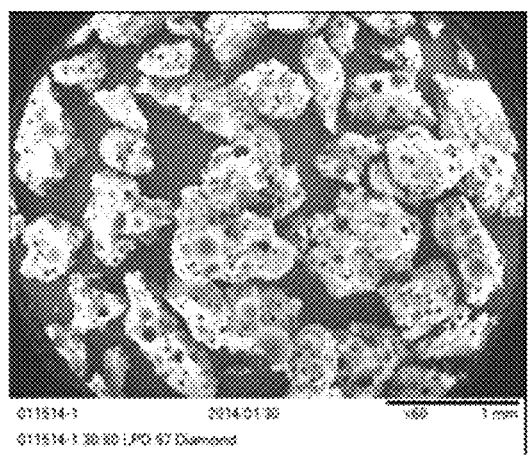
FIG. 13A is an image of abrasive aggregates according to an embodiment.
Figure 13B:
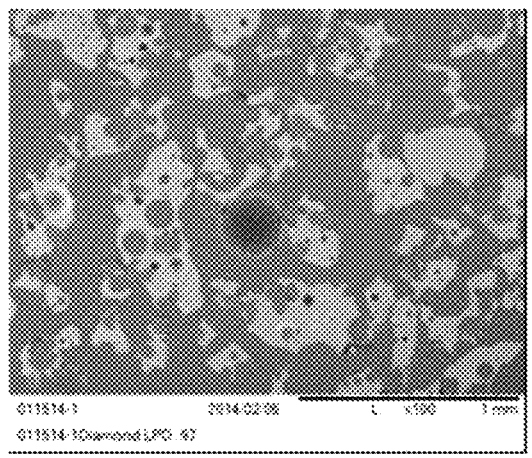
FIG. 13B is a cross section image of the abrasive aggregates shown in FIG. 13A.

The dried precursor granules were re-screened with mesh 30 and then placed in a shallow sagger over bed of aluminum oxide grain (38A F320, 29 µm). The loaded saggers were placed in a kiln and fired with the firing profile: ramp at 180° C./hr., soak at 750° C. for 1 hr. After the firing cycle, the dried precursor granules had turned into a thin solid plate. The thin plate was hammer crushed into pieces having a 5-10 mm size, which then further crushed using a two-roll crusher. The crushed fired aggregates were screened and collected between mesh 30 and 80 (0.18 to 0.6 mm). FIG. 13A and FIG. 13B are SEM images of the fired aggregates of S7.

The abrasive performance, loose pack density, porosity, and crush strength are to be evaluated.

TABLE 9

Properties of S7 fired aggregates

| Sample | wt % Glass Bond | Aggregate Size Cut | Loose Pack Density (g/cm3) | Crush % (35/45) @ 5 MPa | Comments |
|---|---|---|---|---|---|
| S7 | 68.2 | mesh 30/80 | 0.97 | 45 | glass bond A and 6.8 wt % Alumina |

The completed abrasive aggregates were used to make inventive abrasive discs. The inventive abrasive discs were compared to conventional (control) diamond cloth abrasive discs. The inventive discs had a useful life than was approximately twice as long as the control discs. The inventive discs had a higher cumulative cut rate that varied from about 15% to 30% higher than the cut rate for the control discs.

Example 5

S8-S11

Samples 8 was prepared according to the following method using the dry and fired aggregate having the composition described below in Table 10.

TABLE 10

Abrasive Aggregates S8

| | S8 wt % Dry | S8 wt % Fired |
|---|---|---|
| Glass Bond A | 33.1 | 33.1 |
| Diamonds | 63.6 | 63.6 |
| SiC | 3.3 | 3.3 |

S9-S11 were prepared using the dry S8 precursor granules according to the following method:

For each sample S9-S11, 100 grams of the dry S8 precursor granules were mixed with a specific amount of SiC powder (size J2500, 5 micron) to form a mixture of dry granules and SiC powder. For Sample S9, the 100 grams dry green aggregates were mixed with 50 grams of SiC J2500. For Sample S10, the 100 grams of dry precursor granules were mixed with 66 grams of SiC powder (J2500, 5 micron). For Sample 11, the 100 grams of dry precursor granules were mixed with 100 grams of SiC powder (J2500, 5 micron). The mixtures of SiC coated precursor granules were each loaded into a sagger (bed depth less than ⅜ inches) and fired at 750° C. for about 1 hour. The fired abrasive aggregate was collected between mesh 30 and 80 (0.18 to 0.6 mm).

Figure 14A:
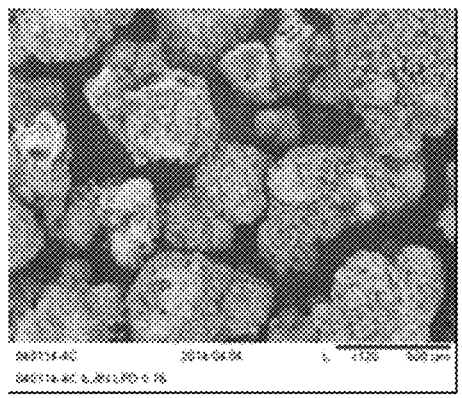
FIG. 14A is an image of abrasive aggregates according to an embodiment.
Figure 14B:
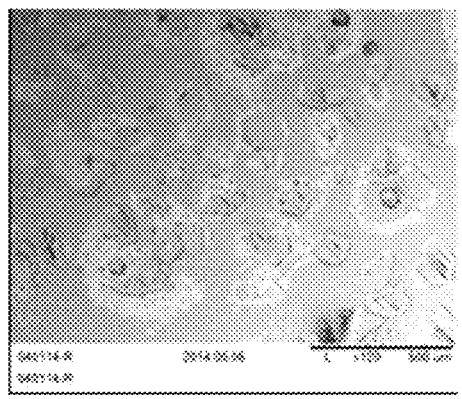
FIG. 14B is a cross section image of the abrasive aggregates shown in FIG. 14A.

The loose pack density, surface area, porosity, and yield of Samples 9-11 were measured. The results of the testing are provided below in Table 11. It appears that increasing the amount of SiC particles to cover the dry precursor granules only slightly changes the loose packed density, porosity, and surface area, but significantly increases the yield of usable abrasive aggregates from 53% up to 70% and up to 93%. FIGS. 14A and 14B are SEM images showing that the fired abrasive aggregates were covered with a layer of fine silicon carbide particles.

TABLE 11

Abrasive Aggregates S9, S10, S11

| Sample | g Precursor Granules | g SiC Powder | % SiC | LPD | BET m2/g | Hg Poros. | Yield % |
|---|---|---|---|---|---|---|---|
| S9 (2:1) | 100 | 50 | 33.3 | 2.8125 | 0.1427 | 56.28 | 53 |
| S10 (1.5:1) | 100 | 66 | 39.8 | 2.9088 | 0.1228 | 63.72 | 70 |
| S11 (1:1) | 100 | 100 | 50.0 | 2.8837 | 0.1368 | 61.21 | 93.3 |

Example 6

S12

Sample 12 was prepared using the materials and amounts listed in Table 12.

TABLE 12

Abrasive Aggregates S12

| | S12 wt % Wet | S12 wt % Dry | S12 wt % Fired |
|---|---|---|---|
| Glass Bond A | 9.22 | 9.72 | 10 |
| Diamonds | 82.95 | 87.52 | 90 |
| Organic Binder | 7.83 | 2.75 | 0 |
| Alumina | — | — | — |
| SiC | — | — | — |

Figure 15:
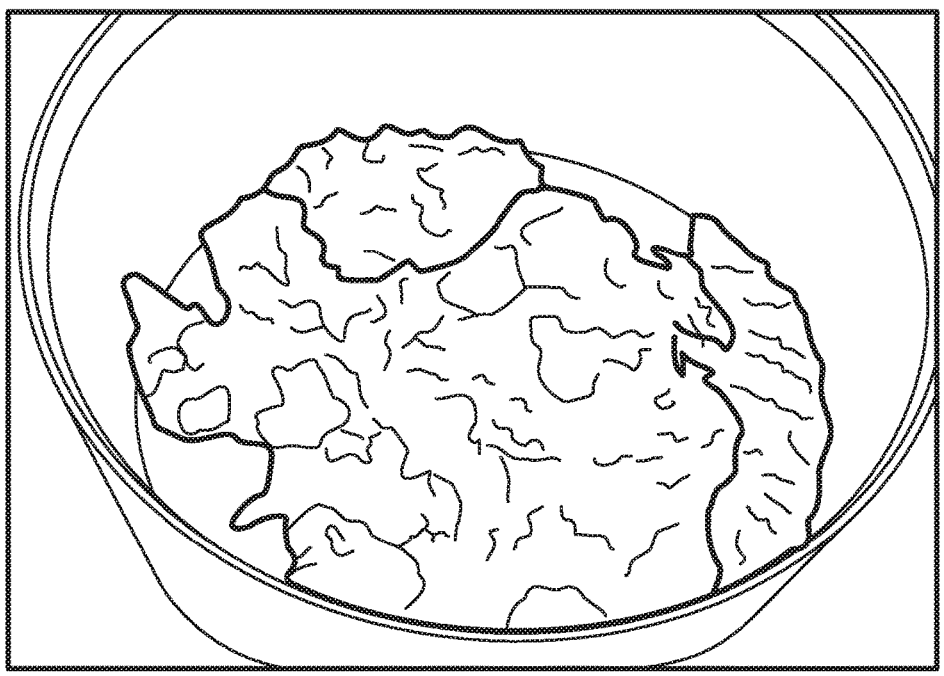
FIG. 15 is an image of a mixture according to an embodiment of abrasive particles, vitreous binder composition, and aqueous organic binder.
Figure 16:
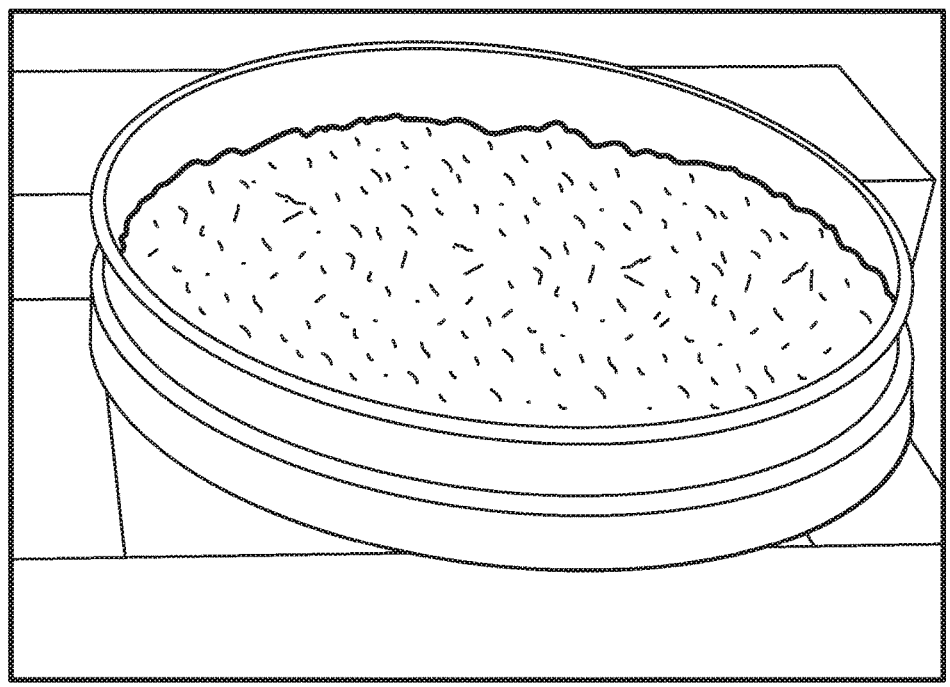
FIG. 16 is an image of abrasive aggregate precursor granules according to an embodiment formed from the mixture shown in FIG. 15.

S12 was prepared according to the following method:

All of the materials listed in Table 12 were added to a beaker, except for the organic binder, and were hand mixed with a spatula until a substantially uniform consistency was reached. The organic binder was then added to form a wet mixture and the wet mixture was added to an automated grinder (Strand Grinder) as shown in FIG. 15. The wet mixture was mixed for 5 seconds, stopped to scrape the walls, and repeated 4 times. The wet mixture was then screened with mesh 20 screen to form precursor granules as shown in FIG. 16.

The screened precursor granules were loaded into a ceramic sagger lined with graphite sheet having a bed depth of less than 5 mm and fired at 750° C. for 1hour. The fired aggregates were collected between mesh 30 and 100. The loose pack density and crush strength of the Sample 12 aggregates was measured as described herein above and the results of the testing are provided below in Table 13.

TABLE 13

Properties of S12 Fired Aggregates

| Sample | wt % Glass Bond | Aggregate Size Cut | Loose Pack Density (g/cm3) | Crush % (40/60) @ 5 MPa |
|---|---|---|---|---|
| S12 | 10 | mesh 30/100 | 1.18 | 69 |

Figure 17:
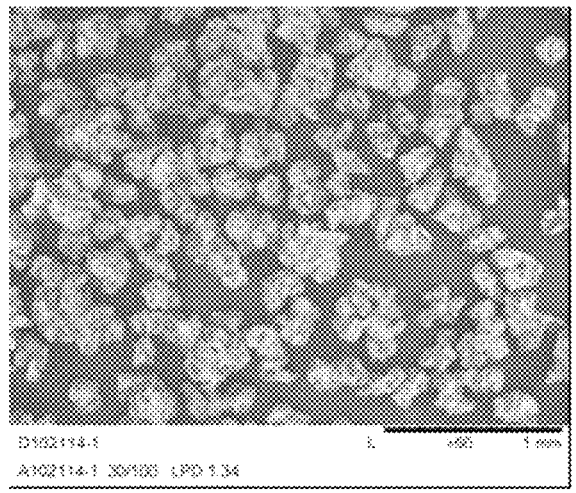
FIG. 17 is an image of abrasive aggregates according to an embodiment formed from the abrasive aggregate precursor granules shown in FIG. 16.
Figure 18:
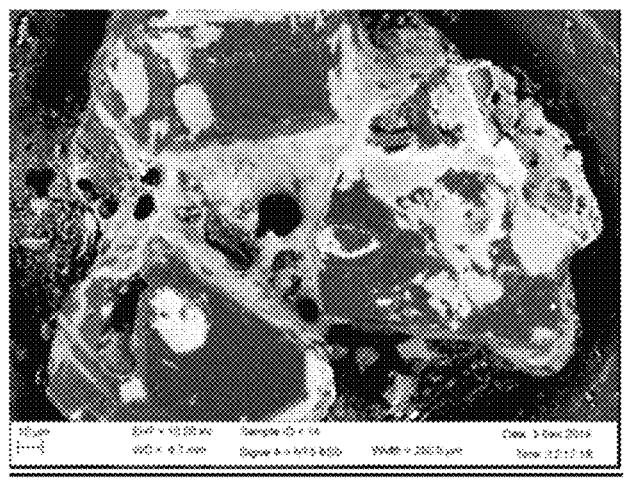
FIG. 18 is a cross section image of the abrasive aggregates shown in FIG. 17.
Figure 19:
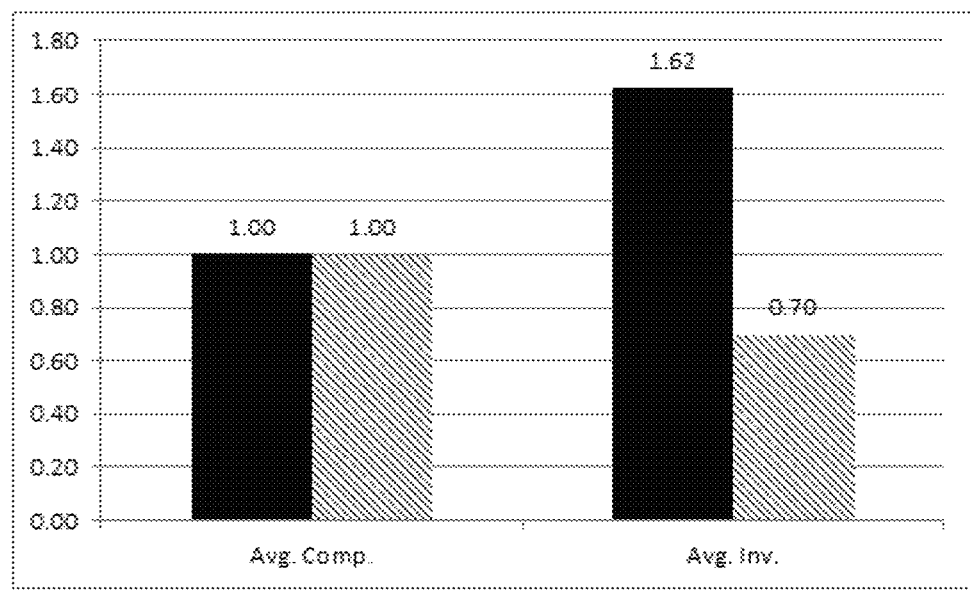
FIG. 19 is a graph comparing abrasive performance of conventional nonwoven grinding wheels that include loose diamond to inventive nonwoven grinding wheels that include abrasive aggregates embodiments shown in FIG. 17.

FIG. 17 shows an SEM image of the fired aggregates of S12.

Control abrasive nonwoven and inventive nonwoven abrasive wheels were prepared and were used to conduct abrasive testing ("90 Degree Angle Testing") according to the conditions listed below.

Figure 20:
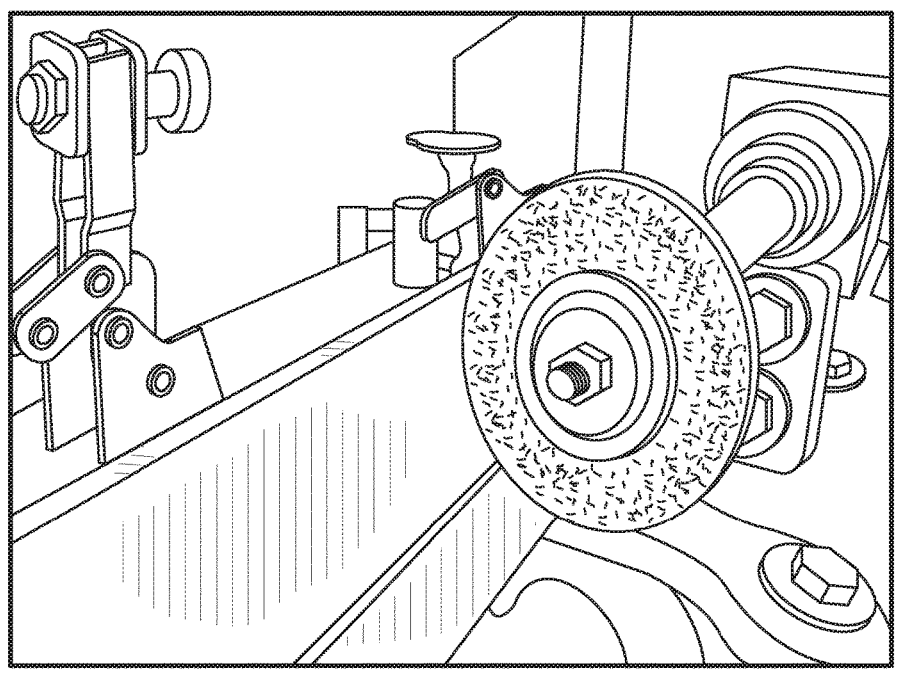
FIG. 20 is a photograph showing an inventive nonwoven abrasive wheel set up to conduct 90 Degree Angle testing that includes the inventive abrasive aggregates shown in FIG. 17.

Contact Angle: 90 Degrees
Test Speed: 9000 RPM
Dead Weight: 3 lb.
Test Piece: Tungsten Carbide
Cycles (1 min.): 5 cycles The control wheels included conventional loose diamond grit size 120/140. The inventive nonwoven wheels included the S12 aggregates. An inventive S12 wheel and the 90 Degree Angle Testing set-up are shown in FIG. 20. The 90 Degree Angle Testing results are listed in Table 14.

TABLE 14

Flat Surface Testing Results

| ID | Grain | Shed | Cut | Grind ratio | Comparison to Avg. Control Cut | Comparison to Avg. Control Grind Ratio |
|---|---|---|---|---|---|---|
| D52 | Control. 1 | 0.93 | 2.82 | 3.03 | 0.97 | 1.03 |
| D52 | Control. 2 | 0.99 | 2.96 | 2.99 | 1.02 | 1.02 |
| D52 | Control 3 | 0.97 | 2.87 | 2.96 | 0.99 | 1.01 |
| D52 | Control 4 | 1.07 | 2.96 | 2.77 | 1.02 | 0.94 |
|  | Avg. Control | 0.99 | 2.90 | 2.94 | 1.00 | 1.00 |
| DA1 | Inv. 1 | 2.17 | 4.81 | 2.22 | 1.66 | 0.75 |
| DA1 | Inv. 2 | 2.01 | 4.52 | 2.25 | 1.56 | 0.77 |
| DA1 | Inv. 3 | 2.97 | 4.78 | 1.61 | 1.65 | 0.55 |
| DA1 | Inv. 4 | 2.23 | 4.73 | 2.12 | 1.63 | 0.72 |
|  | Avg. Inv. | 2.35 | 4.71 | 2.05 | 1.62 | 0.70 |

As is shown, all the inventive wheels produced a higher cumulative cut than the control wheels. The inventive wheels did have a higher shed rate than the control wheels; however, the average grind ratio (mass removed from workpiece/mass shed from wheel) of the inventive wheels was surprisingly only about 30% lower than the average for the control wheels but was surprisingly able to achieve an average cumulative cut that was 62% higher than the average for the control wheels. Such an increased cumulative cut is particularly beneficial and significant for particular hard workpiece surfaces, such as tungsten carbide, as was used in the testing.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. An abrasive aggregate comprising:
   a vitreous binder composition and
   abrasive particles dispersed in the vitreous binder composition,
   wherein the abrasive particles are diamonds,
   wherein the vitreous binder composition has a glass transition temperature (Tg) in a range of 490° C. to 700° C.,
   wherein the vitreous binder composition comprises not less than 1 wt % and not greater than 40 wt % of the weight of the abrasive aggregate,
   wherein the abrasive particles comprise not less than 60 wt % and not greater than 99 wt % of the weight of the abrasive aggregate, and
   wherein the abrasive aggregate has a loose packed density in a range of not less than 0.5 g/cm$^3$ to not greater than 3.5 g/cm$^3$.

2. The abrasive aggregate of claim 1, further comprising one or more modifier particles dispersed in the vitreous binder composition.

3. The abrasive aggregate of claim 1, further comprising a layer of outer particles disposed on at least a portion of the outer surface of the abrasive aggregate.

4. A method of forming an abrasive aggregate comprising:
   mixing together a plurality of abrasive particles and a vitreous binder composition to form a mixture;
   shaping the mixture to form a plurality of abrasive aggregate precursor granules; and
   sintering the abrasive aggregate precursor granules to form a plurality of abrasive aggregates,
   wherein the abrasive particles are diamonds,
   wherein the vitreous binder composition has a glass transition temperature (Tg) in a range of 490° C. to 700° C.,
   wherein the vitreous binder composition comprises not less than 1 wt % and not greater than 40 wt % of the weight of the abrasive aggregate, wherein the abrasive particles comprise not less than 60 wt % and not greater than 99 wt % of the weight of the abrasive aggregate, and wherein the abrasive aggregate has a loose packed density in a range of not less than 0.5 g/cm$^3$ to not greater than 3.5 g/cm$^3$.

5. The abrasive aggregate of claim 1, wherein the vitreous binder composition comprises not less than 1 wt % and not greater than 15 wt % of the weight of the abrasive aggregate.

6. The abrasive aggregate of claim 5, wherein the abrasive particles comprise not less than 85 wt % and not greater than 99 wt % of the weight of the abrasive aggregate.

7. The aggregate of claim 2, wherein the one or more modifier particles comprise not less than 0.5 wt % and not greater than 15 wt % of the weight of the abrasive aggregate.

8. The abrasive aggregate of claim 1, wherein the abrasive aggregate has a loose packed density in a range of not less than 0.9 g/cm$^3$ to not greater than 1.5 g/cm$^3$.

9. The abrasive aggregate of claim 1, wherein the abrasive aggregate has a porosity in a range of 5% to 85% as measured by mercury porosimetry.

10. The abrasive aggregate of claim 1, wherein the diamonds are in a size range of not less than 1 micron and not greater than 2000 microns.

11. The abrasive aggregate of claim 1, wherein the abrasive aggregate has a size in a range of not less than 2 microns and not greater than 4000 microns.

12. The abrasive aggregate of claim 1, wherein the modifier particles are silicon carbide particles, cerium particles, alumina particles, or a combination thereof.

13. The abrasive aggregate of claim 1, wherein the modifier particles are in a size range of not less than 0.5 microns and not greater than 100 microns.

14. The abrasive aggregate of claim 1, wherein the vitreous binder composition has a sintering temperature (Ts) in a range of 550° C. to 800° C.

15. The abrasive aggregate of claim 1, wherein the vitreous binder composition comprises not less than 1 wt % and not greater than 15 wt % transition metal.

16. The abrasive aggregate of claim 1, wherein the vitreous binder composition comprises about 40 wt % to 65 wt % of acid oxides, about 15 wt % to 30 wt % of amphoteric oxides, and about 15 wt % to 25 wt % combined base oxides and neutral oxides.

17. The abrasive aggregate of claim 3, wherein the ratio of the size of the outer particles to the size of the abrasive aggregate (Size$_{outer}$:Size$_{Aggregate}$) is in a range of 1:500 to 1:50.

18. A nonwoven abrasive article comprising:
a nonwoven web;
a binder disposed on the nonwoven web, and a plurality of abrasive aggregates according to claim 1 that are disposed on or in the binder.

* * * * *